United States Patent
Chang et al.

(10) Patent No.: US 11,065,576 B2
(45) Date of Patent: Jul. 20, 2021

(54) WET FLUE GAS DESULFURIZATION APPARATUS

(71) Applicant: DOOSAN HEAVY INDUSTRIES & CONSTRUCTION CO., LTD., Changwon-si (KR)

(72) Inventors: In Gab Chang, Yongin-si (KR); Ja Hyung Koo, Suwon-si (KR); Joon Ho Kim, Yongin-si (KR); Sang Gun Na, Seoul (KR)

(73) Assignee: DOOSAN HEAVY INDUSTRIES & CONSTRUCTION CO., LTD., Gyeongsangnam-do (KR)

( * ) Notice: Subject to any disclaimer, the term of this patent is extended or adjusted under 35 U.S.C. 154(b) by 279 days.

(21) Appl. No.: 16/243,156

(22) Filed: Jan. 9, 2019

(65) Prior Publication Data
US 2019/0224619 A1    Jul. 25, 2019

(30) Foreign Application Priority Data

Jan. 19, 2018 (KR) .................. 10-2018-0007365
Jan. 25, 2018 (KR) .................. 10-2018-0009420

(51) Int. Cl.
*B01D 53/34* (2006.01)
*B01D 53/50* (2006.01)
(Continued)

(52) U.S. Cl.
CPC ......... *B01D 53/346* (2013.01); *B01D 53/504* (2013.01); *B01D 53/73* (2013.01);
(Continued)

(58) Field of Classification Search
CPC .......... B01D 2251/102; B01D 2251/11; B01D 2251/404; B01D 2251/606;
(Continued)

(56) References Cited

U.S. PATENT DOCUMENTS

| 5,762,883 A * | 6/1998 | Okazoe ............... B01D 53/504 422/168 |
| 5,766,563 A * | 6/1998 | Tanaka ................ B01D 53/346 423/242.1 |
| 2015/0190750 A1* | 7/2015 | Liu ...................... B01D 53/504 423/243.08 |

FOREIGN PATENT DOCUMENTS

| CN | 1131580 A | 9/1996 |
| JP | 4776630 B2 | 9/2011 |
| (Continued) |

OTHER PUBLICATIONS

English translation of Korean Office Action dated Feb. 20, 2019 in connection with Korean Patent Application No. 10-2018-0007365.
(Continued)

*Primary Examiner* — Cabrena Holecek
(74) *Attorney, Agent, or Firm* — INVENSTONE Patent, LLC (57) ABSTRACT

A wet flue gas desulfurization apparatus includes an absorption tank in which an absorption solution containing an alkaline absorbent is stored; an absorption tower extending upward from the absorption tank; a flue gas inlet duct communicating with a first portion of the absorption tower; a flue gas outlet duct communicating with a second portion of the absorption tower; a spray unit to spray the absorption solution inside the absorption tower; a circulation pump to pump the absorption solution from the absorption tank and to supply the absorption solution to the spray unit; a byproduct discharging unit to discharge a byproduct downward from the absorption tank; and an oxygen supply pipe through which an oxygen-containing gas is supplied to a target point in the absorption tank, the target point being adjustable along a vertical direction or a horizontal direction, enabling adjustment of an internal position to which the gas is supplied.

19 Claims, 10 Drawing Sheets

(51) Int. Cl.
   *B01D 53/73* (2006.01)
   *B01D 53/78* (2006.01)
   *G01N 27/416* (2006.01)

(52) U.S. Cl.
   CPC ......... *B01D 53/78* (2013.01); *G01N 27/4168* (2013.01); *B01D 2251/102* (2013.01); *B01D 2251/11* (2013.01); *B01D 2251/404* (2013.01); *B01D 2251/606* (2013.01); *B01D 2258/0283* (2013.01)

(58) Field of Classification Search
   CPC .......... B01D 2258/0283; B01D 53/346; B01D 53/504; B01D 53/73; B01D 53/78; G01N 27/4168
   See application file for complete search history.

(56) References Cited

FOREIGN PATENT DOCUMENTS

| | | |
|---|---|---|
| KR | 101794628 B1 | 11/2017 |
| WO | 2017/014200 A1 | 1/2017 |

OTHER PUBLICATIONS

English Summary of the Chinese Office Action dated Mar. 17, 2021.

\* cited by examiner

WET FLUE GAS DESULFURIZATION APPARATUS

CROSS REFERENCE TO RELATED APPLICATIONS

The present application claims priority to Korean Patent Application Nos. 10-2018-0009420 and 10-2018-0007365, filed on Jan. 25, 2018, and Jan. 19, 2018, respectively. The disclosures of the above-listed applications are hereby incorporated by reference herein in their entirety.

FIELD

The present invention relates to a wet flue gas desulfurization apparatus and, more particularly, to a wet flue gas desulfurization apparatus capable of effectively supplying an oxygen-containing gas for oxidation and efficiently discharging a byproduct.

BACKGROUND

When fuel containing sulfur is burned, the sulfur is mostly released into the air in the form of sulfur dioxide ($SO_2$) and only a small portion of the sulfur results in ash. Sulfur dioxide causes air pollution and acid rain on the earth, thereby having a detrimental effect on natural environment as well as humans and animals.

To this end, large-scale incineration and power plants have typically been equipped with a flue gas desulfurization unit. Although various apparatuses have been proposed for flue gas desulfurization, wet-type flue gas desulfurization apparatuses are dominant.

In a wet desulfurization process, a flue gas comes in contact with a liquid (hereinafter referred to as an absorption solution) containing an absorbing reactant (i.e., an absorbent). That is, gas-liquid contact occurs. Thus, sulfur dioxide contained in the flue gas is absorbed, resulting in $SO_2$ removal. The sulfur dioxide transferred from the flue gas to the absorption solution forms sulfite. The sulfite is usually oxidized in the absorption solution to form stable sulfate. To promote this oxidation reaction, typically air is pumped into the absorption solution by an air blower.

The wet flue gas desulfurization apparatus utilizing the above process is of a so-called oxidation tank type. That is, when air is blown into an oxidation tank, the air comes into contact with the absorption solution onto which sulfur dioxide is absorbed.

In this process, it is required to effectively promote air-to-liquid (absorption solution) contact in the tank to improve the oxidation efficiency.

Korean Utility Model Application Publication No. 1998-0030926 discloses a wet fluid gas desulfurization apparatus. The apparatus is configured such that air is fed to an absorption tower circulation tank via an air intake tube. Sulfurous acid calcium ($CaSO_3$), which is an absorbent contained in an absorption solution, is oxidized by reacting with oxygen contained in the air, thereby producing gypsum. The air intake tube is fixed to a lower portion of the circulation tank. Therefore, air is pumped into a lower part of the body of the absorption solution residing in the circulation tank. In this case, an additional oxidation agitator is used to thoroughly mix the air with the absorption solution in the circulation tank.

However, the above known wet flue gas desulfurization apparatus exhibits high power consumption attributable to the agitation of the absorption solution in the circulation tank and exhibits low oxygen utilization efficiency due to air circulation occurring locally.

Moreover, since gypsum generated through the oxidation reaction and the absorption solution are continuously mixed due to the agitation of the absorption solution, a large amount of gypsum is likely to be present in the absorption solution pumped into a spray nozzle.

Furthermore, it is difficult to accurately and precisely control the flow rate of air blown to the absorption solution due to a local oxidation reduction potential distribution in the circulation tank.

SUMMARY

Accordingly, the present disclosure has been made in view of the problems occurring in the related art and an objective of the present disclosure is to provide a wet flue gas desulfurization apparatus being capable of effectively supplying an oxygen-containing gas to increase oxidation efficiency and of efficiently discharging a byproduct.

In order to achieve the object of the present disclosure, according to one embodiment of the present disclosure, there is provided a wet flue gas desulfurization apparatus including an absorption tank in which an absorption solution containing an alkaline absorbent is stored; an absorption tower extending upward from the absorption tank; a flue gas inlet duct communicating with a first portion of the absorption tower; a flue gas outlet duct communicating with a second portion of the absorption tower; a spray unit configured to spray the absorption solution inside the absorption tower; a circulation pump configured to pump the absorption solution out of the absorption tank and to supply the absorption solution to the spray unit; a byproduct discharging unit configured to discharge a byproduct downward from the absorption tank; and an oxygen supply pipe through which an oxygen-containing gas is supplied to a target point in the absorption tank, the target point being adjustable along a vertical direction or a horizontal direction.

The apparatus may further include a swiveling coupling unit for coupling the oxygen supply pipe to the absorption tank via a through hole formed in a wall of the absorption tank. The swiveling coupling unit may include an outer shell fixed in the through hole; and an inner body rotatably disposed in the outer shell and fixedly combined with the oxygen supply pipe.

The outer shell may have a middle hole to accommodate the inner body and may be open at both axial ends such that the oxygen supply pipe extends through the outer shell from one axial end to the other axial end of the outer shell.

The oxygen supply pipe may axially extend through the outer shell and may have an inner end that is disposed in the absorption tank and that includes bend.

The outer shell may have an inner hole and an outer hole provided respectively at an inner side and an outer side of the middle hole. Each of the inner and outer holes may be tapered toward the axial end of the outer shell such that a vertical dimension of each of the inner and outer holes gradually increases with a distance from the middle hole to the axial end of the outer shell.

Wherein a size of the inner hole and a size of the outer hole may be determined according to an upward inclination angle and a downward inclination angle of the oxygen supply pipe.

The apparatus may further include a sealing member disposed in the inner hole and configured to prevent an inside of the inner hole from communicating with an inside of the absorption tank. The oxygen supply pipe may pass through the sealing member, and the sealing member may be deformable according to an upward inclination and a downward inclination of the oxygen supply pipe.

The oxygen supply pipe may be coupled with the absorption tank such that a length of the oxygen supply pipe is adjustable within the absorption tank.

The oxygen supply pipe may comprise at least one of a first supply pipe coupled with the absorption tank and a second supply pipe that is slidable through an inside of the first supply pipe to move toward the inside of the absorption tank.

The apparatus may further include a density meter configured to measure a density of the absorption solution in the absorption tank.

The oxygen-containing gas may be supplied to a lower region in the absorption tank when the density measured by the density meter is not greater than a predetermined value, and the oxygen-containing gas may be supplied to an upper region in the absorption tank when the density measured by the density meter is greater than the predetermined value.

The apparatus may further include an oxidation-reduction potential (ORP) meter configured to measure an ORP value of the absorption solution in each of a plurality of regions in the absorption tank. The ORP meter may include a plurality of measurement vessels for storing the absorption solution sampled from the plurality of regions of the absorption tank, respectively; and a plurality of ORP electrodes installed in the measurement vessels, respectively.

The ORP meter may further include a comparison vessel for storing the absorption solution sampled from a predetermined region of the plurality of regions of the absorption tank; a sub-oxygen supply pipe configured to supply the oxygen-containing gas to the comparison vessel to completely oxidize the absorption solution in the comparison vessel; and an ORP electrode installed in the comparison vessel.

When an ORP value of the absorption solution sampled from one region of the plurality of regions of the absorption tank is lower than a reference ORP value, the oxygen-containing gas may be supplied to the one region.

The reference ORP value may correspond an ORP value measured by the ORP electrode installed in the comparison vessel.

The oxygen supply pipe may include a plurality of oxygen supply pipes arranged at multiple steps along a height direction of the absorption tank.

The plurality of oxygen supply pipes may be selectively used for supplying the oxygen-containing gas to a region within the absorption tank.

The apparatus may further include a driving unit configured to move the oxygen supply pipe to adjust the target point.

The oxygen supply pipe may include a plurality of oxygen supply pipes respectively arranged at intervals along a circumferential direction of the absorption tank, each oxygen supply pipe being horizontally inclined at an equal angle.

According to the present invention, the region (target point) to which the oxygen-containing gas is supplied, within the absorption tank, through the oxygen supply pipe, may be adjusted along a horizontal direction, a vertical direction, or both. Therefore, the oxygen-containing gas for causing an oxidation reaction can be effectively supplied to the absorption solution in the absorption tank.

Specifically, the target point of the supply of the oxygen-containing gas can be adjusted according to the oxidation-reduction potential (ORP) value that varies locally within the absorption solution in the absorption tank. That is, the ORP values of the absorption solution in the respective regions of the absorption tank are compared against a reference ORP value, and the orientation and/or position of the oxygen supply pipe is adjusted such that the oxygen-containing gas can be supplied to the region corresponding to an ORP value lower than the reference ORP value. Therefore, the oxygen-containing gas can be effectively supplied to the absorption solution in the absorption tank.

In addition, since the oxygen-containing gas can be selectively supplied to an upper region or a lower region in the absorption tank as necessary, the absorption solution in the absorption tank can be divided into an active reaction region in which sulfite reacts with oxygen contained in the oxygen-containing gas to generate a byproduct (gypsum) and a stable region in which sedimentation of the byproduct occurs.

Therefore, the oxidation of sulfite can be effectively performed and the byproduct can be effectively discharged out of the absorption tank. Therefore, the absorption solution that is pumped out from the absorption tank to be recycled and then supplied to the spray unit does not contain a significant amount of the byproduct, and the absorbent remaining in the absorption solution that is pumped out from the absorption tank can be effectively recovered.

As a result, flue gas desulfurization efficiency can be increased.

The effects, features, and advantages of the invention are not limited to the above effects, features, and advantages, and other effects, features, and advantages of the invention will be understood from a detailed description of the invention or the configurations recited in the accompanying claims.

DETAILED DESCRIPTION

Hereinafter, wet flue gas desulfurization apparatuses according to exemplary embodiments of the present disclosure will be described with reference to FIGS. 1 through 10.

It is to be understood that the terms used herein are defined in consideration of the functions of the present invention, and may be altered according to the intent of a user or operator, or conventional practice. Therefore, the terms should be defined on the basis of the entire content of this specification. Embodiments of the present invention described blow are presented to make complete the disclosure of the present invention and help those who are ordinarily skilled in the art best understand the invention. The embodiments are for describing particular aspects only and are not intended to be limiting of the present invention.

A description of elements that are not related to the invention will be omitted to clarify the invention, and identical or similar elements are denoted by identical or similar reference characters throughout the drawings and the detailed description below. It will be further understood that the terms "comprises," "comprising,", "includes" and/or "including," when used herein, specify the presence of stated features, integers, steps, operations, elements, and/or components, but do not preclude the presence or addition of one or more other features, integers, steps, operations, elements, components, and/or groups thereof.

A wet flue gas desulfurization apparatus in the present disclosure is an apparatus for removing sulfur dioxide ($SO_2$) from a flue gas generated by a boiler or the like by using a wet desulfurization process.

First, a wet flue gas desulfurization apparatus according to a first embodiment of the present disclosure will be described with reference to FIGS. 1 to 4.

Figure 1:
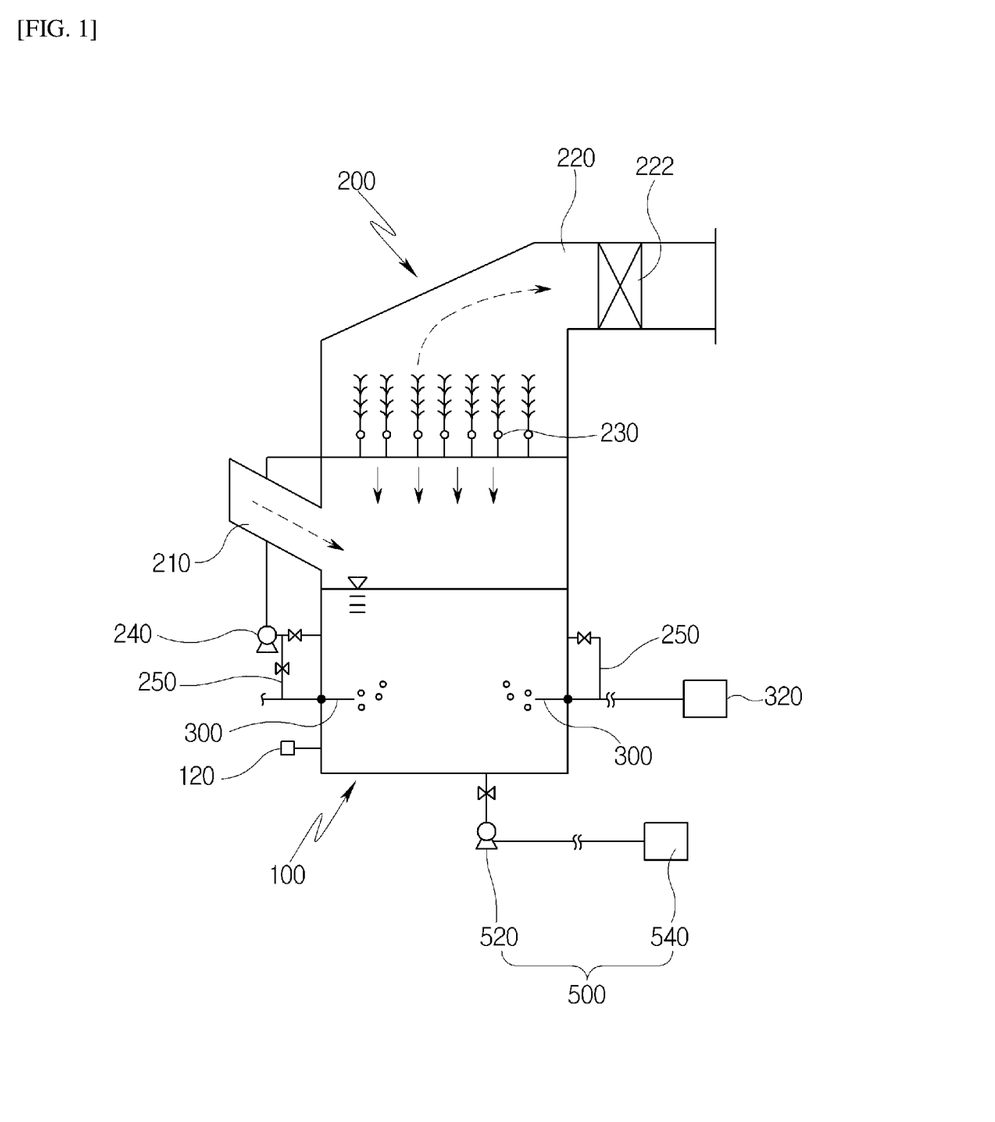
FIG. 1 is a schematic diagram illustrating a wet flue gas desulfurization apparatus according to a first embodiment of the present disclosure.

The wet flue gas desulfurization apparatus according to the first embodiment of the present disclosure includes an absorption tank 100, an absorption tower 200, a flue gas inlet duct 210, an exhaust gas outlet duct 220, a spray unit 230, a circulation pump 240, multiple oxygen supply pipes 300, a swiveling coupling unit 400, and a byproduct discharging unit 500.

Specifically, the absorption tank 100 stores a liquid (hereinafter referred to as an absorption solution) containing an alkaline absorbent. In the present embodiment, limestone ($CaCO_3$) is used as the alkaline absorbent. The absorption tank 100 may come in various shapes. For example, the absorption tank 100 may have a circular transverse cross section, a rectangular transverse cross section, or the like. In the present embodiment, the absorption tank 100 is a cylindrical tank having a circular transverse cross section.

The absorption tower 200 extends vertically upward from the top of the absorption tank 100. The absorption tower 200 and the absorption tank 100 may be integrally combined.

The flue gas inlet duct 210 for feeding a flue gas is connected to a portion of the wall of the absorption tower 200. The flue gas outlet duct 220 for discharging the flue gas is connected to an upper portion of the absorption tower 200. A demister 222 for eliminating mist is provided inside the flue gas outlet duct 220 to remove mist present above the surface of the absorption solution.

In the present embodiment, in FIG. 1, the flue gas inlet duct 210 is connected to one side of a lower portion of the absorption tower 200, and the flue gas outlet duct 220 is connected to an upper portion of the absorption tower 200 on a side opposite to the flue gas inlet duct 210.

The connections of the flue gas inlet duct 210 and the flue gas outlet duct 220 with the absorption tower are not limited to the example shown in FIG. 1. However, it is required that the flue gas fed through the flue gas inlet duct 210 comes into contact with the absorption solution sprayed by the spray unit 230 and afterward the flue gas is discharged through the flue gas outlet duct 220.

The spray unit 230 for spraying the absorption solution is installed inside the absorption tower 200. The circulation pump 240 functions to circulate the absorption solution by pumping the absorption solution out of the absorption tank 100 and then feeding the pumped absorption solution to the spray unit 230.

In the present embodiment, the spray unit 230 is disposed above a position at which the flue gas inlet duct 210 is connected to the absorption tower 2009. The flue gas flows into the absorption tower 200 through the flue gas inlet duct 210, then passes the spray unit 230, and finally flows out of the absorption tower 200 through the flue gas outlet duct 220.

In the present embodiment, the circulation pump 240 preferably pumps the absorption solution out of the absorption tank 100 from a surface region of the absorption solution in the absorption tank 100. This is because the products (for example, $CaSO_4.2H_2O$) resulting from the desulfurization reaction in the absorption tank 100 sink to and settle at the bottom of the absorption tank 100.

In this way, the flue gas fed to the absorption tower 200 through the flue gas inlet duct 210 and the absorption solution that is pumped out of the absorption tank 100 by the circulation pump 240 and sprayed into the absorption tower 200 by the spray unit 230 make a gas-liquid contact. In the meantime, the absorption solution absorbs sulfur dioxide contained in the flue gas.

Specifically, in the absorption tower 200, a reaction described below occurs.

$$SO_2+H_2O+CaCO_3 \rightarrow CaSO_3+H_2O+CO_2 \qquad (1)$$

In this case, preferably, the spray unit 230 is disposed to uniformly spray the absorption solution over the entire transverse cross-sectional area of the absorption tower 200 such that the flue gas cannot exit the absorption tower 200 without coming into contact with the sprayed absorption solution.

Therefore, flue gas free of sulfur dioxide can be discharged into the air through the flue gas outlet duct 220, and the absorption solution that has absorbed the sulfur dioxide falls into the absorption solution remaining in the absorption tank 100.

In the present embodiment, the multiple oxygen supply pipes 300 are installed to pass through the wall of the absorption tank 100 so that air can be fed into the absorption solution in the absorption tank 100 through the oxygen supply pipes 300.

When air is fed into the absorption solution in the absorption tank 100 via the multiple oxygen supply pipes 300, an oxidation reaction of sulfite ($CaSO_3$) occurs in the absorption tank 100, thereby producing gypsum ($CaSO_4 \rightarrow 2H_2O$) as a byproduct. The gypsum is suspended in the absorption solution at the initial stage of the reaction and then sinks to the bottom of the absorption tank 100.

In the absorption tank 100, a reaction described below occurs.

$$CaSO_3+2H_2O+\tfrac{1}{2}O_2 \rightarrow CaSO_4 \rightarrow 2H_2O \qquad (2)$$

Figure 4:
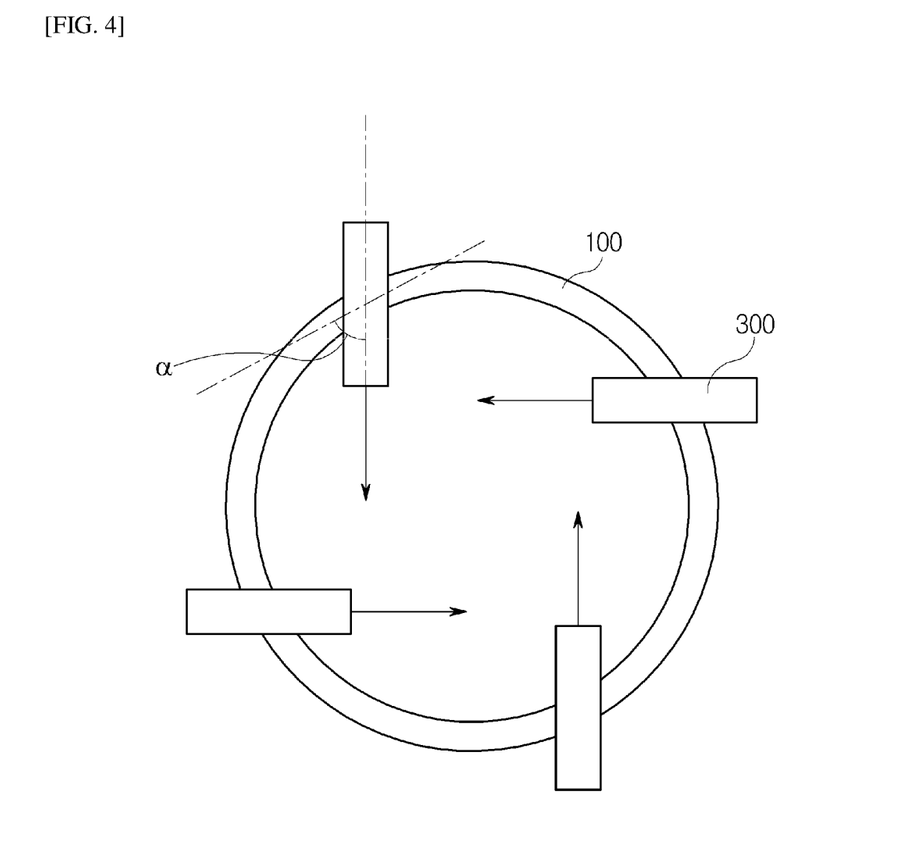
FIG. 4 is a plan view illustrating an exemplary arrangement of oxygen supply pipes of the wet flue gas desulfurization apparatus of FIG. 1.

As illustrated in FIG. 4, the multiple oxygen supply pipes 300 are arranged at angular intervals in a circumferential direction of the absorption tank 100 and all of the oxygen supply pipes 300 are horizontally inclined in the same direction at an equal angle with respect to the circumferential surface of the absorption tank.

That is, in the transverse cross-sectional view of the absorption tank 100 shown in FIG. 4, the orientation (axial direction) of each oxygen supply pipe 300 is not perpendicular to the tangent line at the connecting point at which the oxygen supply pipe 300 is connected with the absorption tank 100. That is, the orientation of each oxygen supply pipe 300 is inclined by a predetermined angle α with respect to the tangent line. The predetermined angle α preferably ranges from 30° to 60°.

With this arrangement of the oxygen supply pipes, the absorption solution in the absorption tank 100 can be agitated by tilted incoming flows of the air introduced into the absorption tank 100 due to the inclined oxygen supply pipes 300. Therefore, it is not necessary to use an agitator 300 to stir the absorption solution in the absorption tank 100. That is, since the air introduced into the absorption tank 100 through the horizontally inclined oxygen supply pipes 300 forms a rotational flow in the absorption tank 100, a duration for contact between the air fed through the oxygen supply pipes 300 and the absorption solution increases.

However, in the present disclosure, a limitation is not imposed on a method of mixing the air with the absorption solution. That is, the absorption tank 100 may be equipped with an additional agitator to more vigorously stir the absorption solution to mix the air and the absorption solution well.

Further, a pipeline 250 is preferably connected to the oxygen supply pipe 300 to cause the absorption solution to flow into the oxygen supply pipes 300. In the present embodiment, the pipeline 250 is connected to the oxygen supply pipes 300 so that the absorption solution in a near-surface region of the absorption tank 100 can flow out of the absorption tank 100 via the oxygen supply pipes 300. Since the pipeline 250 is connected from above to the oxygen supply pipes 300, an additional pump is not necessary.

However, the present disclosure is not limited to this configuration. For example, an additional pump may be used when the pipeline 250 is connected from below to the oxygen supply pipes 300 or when it is necessary to forcefully spray the absorption solution.

In one embodiment, the pipeline 250 is connected to each of the multiple oxygen supply pipes 300. As illustrated in FIG. 1, the absorption solution in a surface region can be collected through each of the oxygen supply pipes 300 for reuse. Alternatively, the absorption solution can be collected by using the circulation pump 240.

The air fed into the oxygen supply pipes 300 through the pipeline 250 is well diffused into and dissolved in the absorption solution introduced into the oxygen supply pipes 300, and the air can be continuously mixed with the absorption solution until a mixture of the air and the absorption solution is sprayed by the spray unit. As a result, the oxygen utilization efficiency can be increased.

According to the present disclosure, each of the oxygen supply pipes 300 is connected to the absorption tank 100 via a swiveling coupling unit 400 which will be described in detail below.

The byproduct discharging unit 500 for discharging the gypsum (i.e., sediment) to the outside of the absorption tank 100 is provided at the bottom of the absorption tank 100. The byproduct discharging unit 500 includes a discharging pump 520 and a solid-liquid separator 540. A lower layer of the absorption solution containing gypsum is pumped out by the discharging pump 520 and is then introduced into the solid-liquid separator 540. The solid-liquid separator 540 separates the drained solution into the gypsum and the filtrate. In this manner, it is possible to completely remove the sulfur dioxide contained in the flue gas and produce the filtrate free of sulfur dioxide.

Next, the filtrate is sent to a filtration tank (not illustrated), mixed with lime, and returned to the absorption tank 100. In this way, the absorption solution can be recycled.

The swiveling coupling unit 400 will be described in detail below with reference to FIGS. 2 and 3. The swiveling coupling unit 400 includes an outer shell 420 fixedly installed in a through hole formed in the wall of the absorption tank 100. The outer shell 420 extends from the outside surface to the inside surface of the wall of the absorption tank 100. The swiveling coupling unit 400 further includes an inner body 440 rotatably provided in a middle portion of the outer shell 420 and fixedly combined with the oxygen supply pipe 300.

In this embodiment, the inner body 440 has a spherical shape and is combined with the oxygen supply pipe 300 in such a manner that the oxygen supply pipe 300 passes through the center of the inner body 440.

The outer shell 420 extends through the wall of the absorption tank 100 and has an overall cylinder shape. The outer shell 420 has at its axial middle a middle hole 422 for accommodating the inner body 440. Both axial ends of the outer shell 420 are open. That is, the outer shell 420 has an inner hole 424 at the inner side of the middle hole 442 and an outer hole 426 at the outer side of the middle hole 442. Thus, the oxygen supply pipe 300 passes the outer hole 426, the middle hole 442, and the inner hole 424 in this order to pass the oxygen from the outside to an internal region within the absorption tank 100.

The middle hole 422 has a spherical shape conforming to the contour of the inner body 440. The inner and outer holes 424 and 426 are tapered such that the size (vertical dimension) of each of the inner and outer holes gradually increases from the middle hole 422 to one or the other open axial end.

Figure 2:
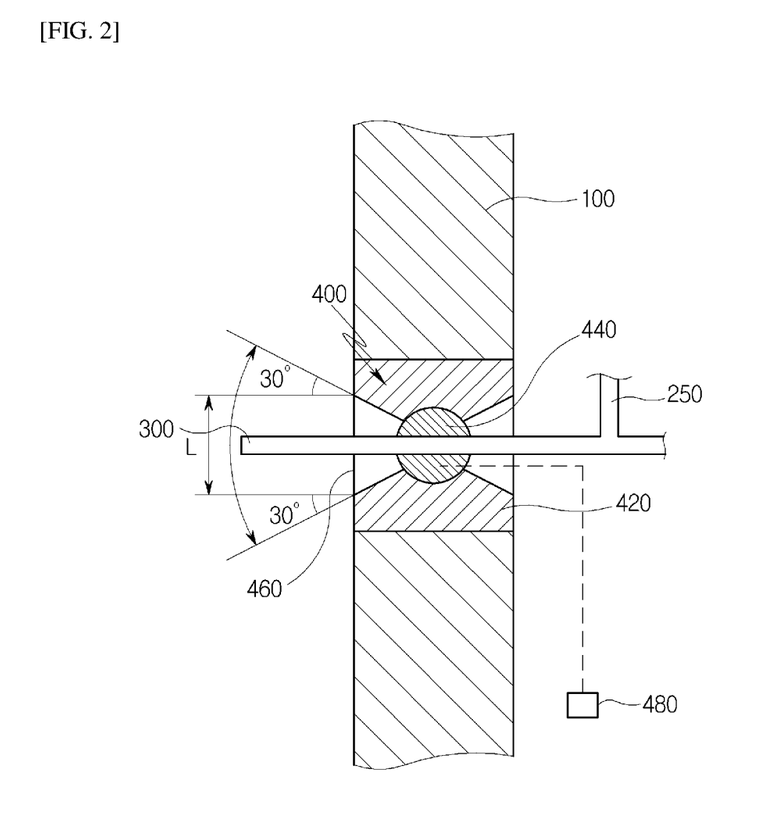
FIG. 2 is an enlarged view of a portion of FIG. 1.
Figure 3:
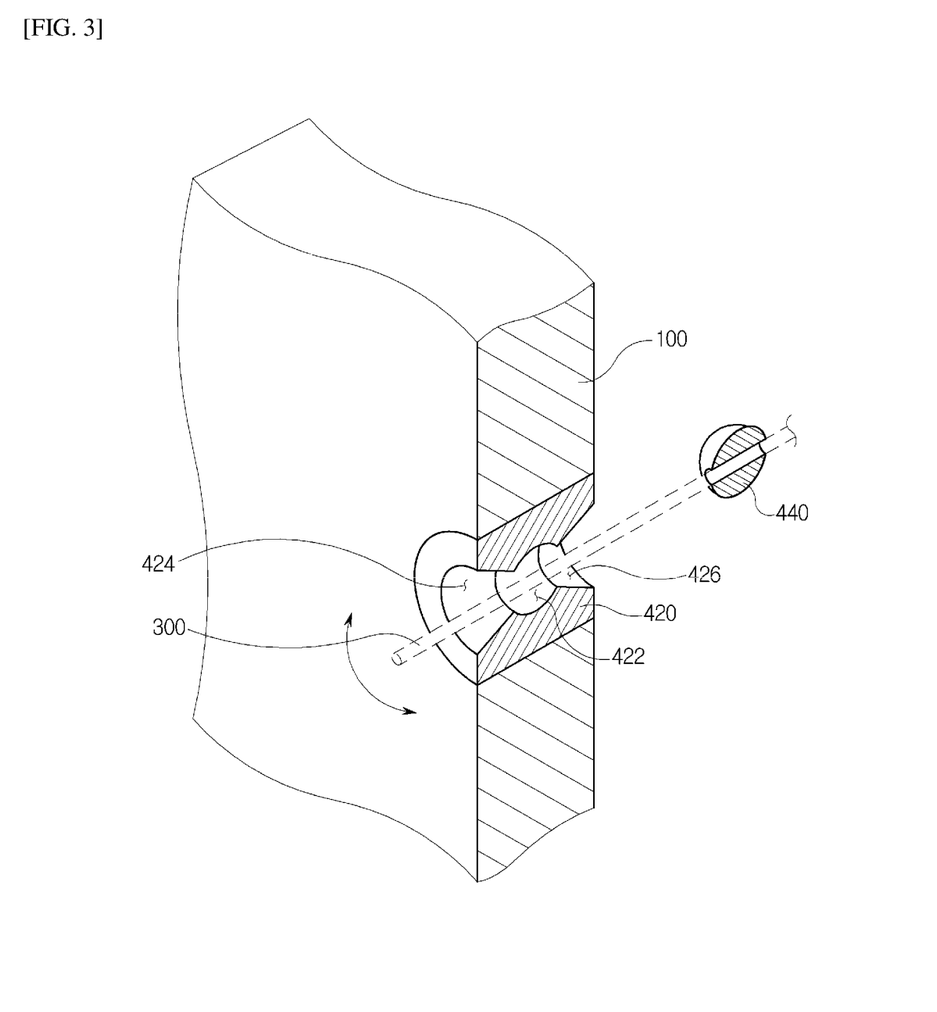
FIG. 3 is an exploded perspective view of the structure of FIG. 2.

That is, as illustrated in FIG. 2, the outer shell 420 has the inner hole (corresponding to a first hole) 424 having an axial end open to the inside of the absorption tank 100 and the outer hole (corresponding to a second hole) 426 having an axial end open to the outside of the absorption tank 100. The first hole 424 and the second hole 426 are symmetrically formed such that the vertical dimension L is equal for a give distance from the middle hole 422.

The vertical dimension L of the first and second holes 424 and 426 is determined depending on a maximum angle of inclination of the oxygen supply pipe 300, which may be inclined upward or downward. The vertical dimension L of the first and second holes 424 and 426 may vary depending on the position at which the oxygen supply pipe 300 is coupled with the absorption tank 100 or depending on the size of the absorption tank 100. In the present embodiment, the oxygen supply pipe 300 is coupled to a middle portion in a vertical direction (i.e., height direction) of the absorption tank 100. The orientation (i.e., inclination) of the oxygen supply pipe 300 is adjusted within an angular range of from a positive angle of 30° to a negative angle of 30° with respect to the horizontal direction.

In addition, a sealing member 460 is provided in the first hole 424 which is open to the inside of the absorption tank 100 to prevent an inside space of the first hole 424 from communicating with an inside space of the absorption tank 100, thereby ensuring fluid-tight sealing. The oxygen supply pipe 300 passes through the center of the sealing member 460. The sealing member 460 is elastically deformable in accordance with the upward or downward inclination of the oxygen supply pipe 300.

For example, the sealing member 460 is a flexible member that is elastically deformable. Alternatively, according to one embodiment of the present disclosure, the sealing member 460 may have a corrugated structure so that the sealing member 460 can be folded or expanded depending on the upward or downward inclination angle of the oxygen supply pipe 300.

According to one embodiment, the wet flue gas desulfurization apparatus further includes an actuator 480 for rotating the inner body 440. The actuator 480 is directly connected with the inner body 440. Alternatively, according to another embodiment, the actuator 480 may be indirectly connected with the inner body 440 via an intermediate connection member.

When the actuator 480 is driven to rotate the inner body 440, the oxygen supply pipe 300 is inclined upward or downward such that an inner end of the oxygen supply pipe 300 is raised toward the upper end or is lowered toward the lower end of the absorption tank 100. The inner end of the oxygen supply pipe 300 is an end disposed inside the absorption tank 100. A target point of the supply of the air (i.e., the destination of the supplied air) within the absorption tank can be adjusted in the height direction (hereinafter also referred to as a vertical direction) of the absorption tank 100.

An outer end of each of the oxygen supply pipes 300 is connected with a gas tank 320. At least a portion of each oxygen supply pipe 300 is flexibly formed. Therefore, even when the inclination angle of the oxygen supply pipes 300 is repetitiously changed, the oxygen supply pipes 300 are not easily broken and maintain a durable connection with the gas tank 320.

In addition, the wet flue gas desulfurization apparatus includes a density meter 120 for measuring the density of the absorption solution contained in the absorption tank 100. In this embodiment, the air supply target point (depth) to which the air is supplied through the oxygen supply pipe 300 is adjusted according to the density measured by the density meter 120. However, in the present disclosure, a method of adjusting the air supply target point (i.e., depth) within the absorption tank 100 is not limited to the above mentioned example. Alternatively, the air supply target point may be adjusted according to an oxidation-reduction potential (ORP) value of the absorption solution, measured with an ORP meter, which locally varies through the absorption solution.

Specifically, until the density measured with the density meter 120 reaches a predetermined value, the oxygen supply pipe 300 is inclined such that the inner end portion of the oxygen supply pipe 300 is directed toward the bottom of the absorption tank 100 so that the air can be supplied deep inside the absorption solution. On the contrary, when the density exceeds the predetermined value, the oxygen supply pipe 300 is reversely inclined such that the inner end portion of the oxygen supply pipe 300 is directed toward the top of the absorption tank 100 so that the air can be supplied to a surface region of the absorption solution. This is because a large density value measured by the density meter 120 means a state in which a large amount of gypsum is produced as a byproduct of the desulfurization process in the absorption solution.

Specifically, since the amount of gypsum produced at the initial stage of the desulfurization process is not significant, air is supplied to a deep region in the absorption tank 100. In this case, the entire body of the absorption solution in the absorption tank 100 can be agitated vigorously. Accordingly, the gypsum forming reaction between sulfur dioxide and absorbent (lime) present in the absorption solution can be vigorously performed through the entire body of the absorption solution in the absorption tank 100.

The amount of the gypsum (byproduct) increases with progress of this reaction. When the gypsum is present in a significant amount in the absorption solution, the vigorous agitation of the absorption solution has a negative effect on sedimentation of the gypsum. Therefore, the amount of gypsum supplied to the spray unit 230 along with the absorption solution pumped by the circulation pipe 240 increases. In addition, since the sedimentation of the gypsum is inhibited and a large amount of gypsum is suspended in the absorption solution, it is difficult to discharge the gypsum (byproduct) out of the absorption tank 100.

To solve this problem, when the density of the absorption solution reaches or exceeds the predetermined value, the orientation (inclination) of the oxygen supply pipe 300 is changed such that the inner end portion of the oxygen supply pipe 300 is directed toward the top of the absorption tank 100. In this case, since the air is supplied to a surface region of the absorption solution, an active reaction region in which the gypsum forming reaction intensively occurs is formed in the surface region due to the supply of the air. On the other hand, a stable region in which sedimentation of the gypsum effectively occurs is formed in a deep region of the absorption solution. Therefore, the gypsum sediment can be effectively discharged out of the absorption tank 100.

Therefore, the invention of the present disclosure has advantages that the oxidation of sulfite can be effectively performed and the byproduct (gypsum) can be effectively discharged out of the absorption tank. Therefore, the absorption solution that is pumped out from the absorption tank to be recycled and supplied to the spray unit does not contain a significant amount of the byproduct, and the absorbent remaining in the absorption solution can be effectively recovered for reuse.

As a result, an effect of increasing the flue gas desulfurization efficiency can be obtained.

Next, referring to FIG. 5, a wet flue gas desulphurization apparatus according to a second embodiment of the present disclosure will be described.

The wet flue gas desulfurization apparatus according to the second embodiment differs from the wet flue gas desulfurization apparatus according to the first embodiment only in the structure of the oxygen supply pipe and the structure of the swiveling coupling unit for coupling the oxygen supply pipe to the absorption tank 100. Other components are the same.

In the second embodiment, a swiveling coupling unit 1400 includes: an outer shell 1420 fixedly installed in a through hole extending through the wall of an absorption tank 100; and an inner body 1440 rotatably provided in the outer shell 420 and fixedly combined with an oxygen supply pipe 1300.

In this embodiment, the inner body 1440 has a spherical shape and is combined with the oxygen supply pipe 1300 in such a manner that the oxygen supply pipe 300 passes through the inner body 1440.

The outer shell 1420 is oriented so as to pass through the wall of the absorption tank 100 and has an overall cylindrical shape. The outer shell 1420 has at its axial middle a middle hole 1422 in which the inner body 1440 is to be accommodated. Both ends of the outer shell 1420 are open. That is, the outer shell 420 has an inner hole 1424 at the inner side of the middle hole 442 and an outer hole 1426 at the outer side of the middle hole 442. Thus, the oxygen supply pipe 1300 passes the outer hole 426, the middle hole 442, and the inner hole 424 in this order to pass the oxygen from the outside to an internal region in the absorption tank 100.

The middle hole 1422 has a spherical shape conforming to the contour of the inner body 1440. In this embodiment, the inner and outer holes 1424 and 1426 have a shape conforming to the contour of the surface of the oxygen supply pipe 1300 that extends to pass through the inner and outer holes 1424 and 1426.

Figure 5:
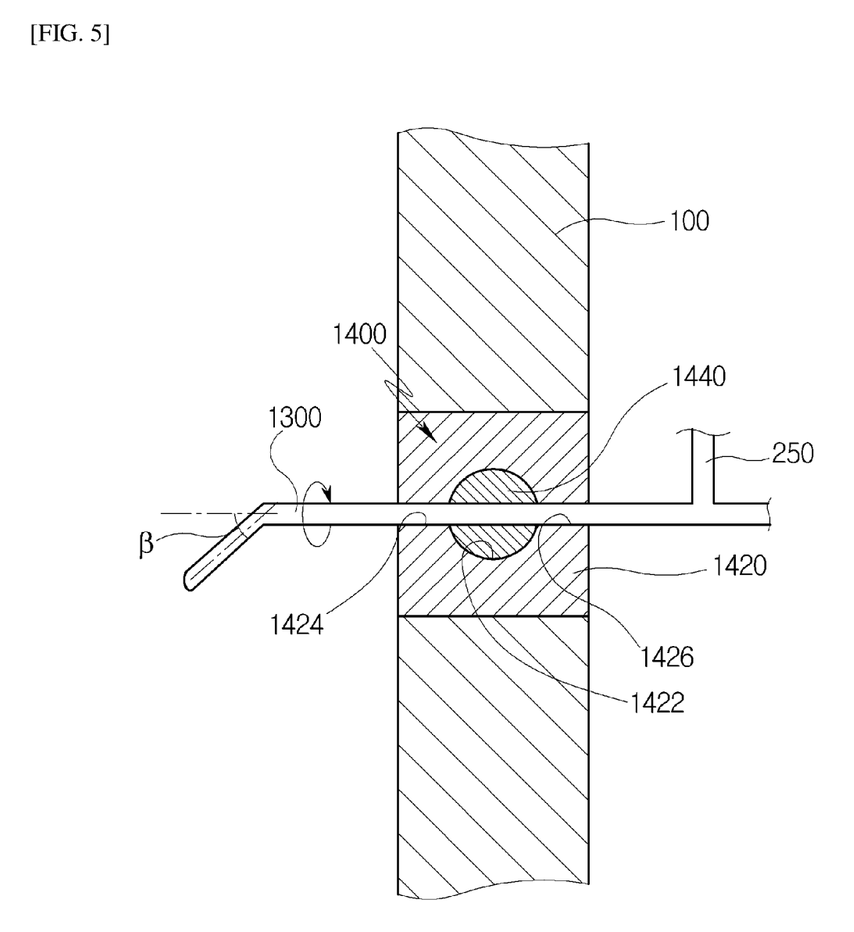
FIG. 5 is an enlarged view of a portion of FIG. 1 according to a second embodiment of the present disclosure.

In other words, as illustrated in FIG. 5, each of the inner and outer holes 1424 and 1426 has a uniform vertical dimension all the way through their lengths. Therefore, the oxygen supply pipes 1300 cannot be inclined upward or downward. This point is different from the first embodiment. However, each of the oxygen supply pipes 1300 can rotate on its own axis.

In this embodiment, an inner end portion of the oxygen supply pipe 1300, the inner end portion being disposed in an absorption tank 100, is bent to diagonally extend at a predetermined slant angle with respect the horizontal direction. The slant angle β of the diagonal direction in which the inner end portion of the oxygen supply pipe 1300 extends varies appropriately. In the present embodiment, the slant angle β is preferably set to 45°.

Since the oxygen supply pipe 1300 rotates on its axis, the orientation of the inner end portion of the oxygen supply pipe 1300 changes with an angle of rotation of the oxygen supply pipe 1300. Therefore, the same effect as that obtained by the first embodiment can be obtained by this second embodiment.

Figure 6:
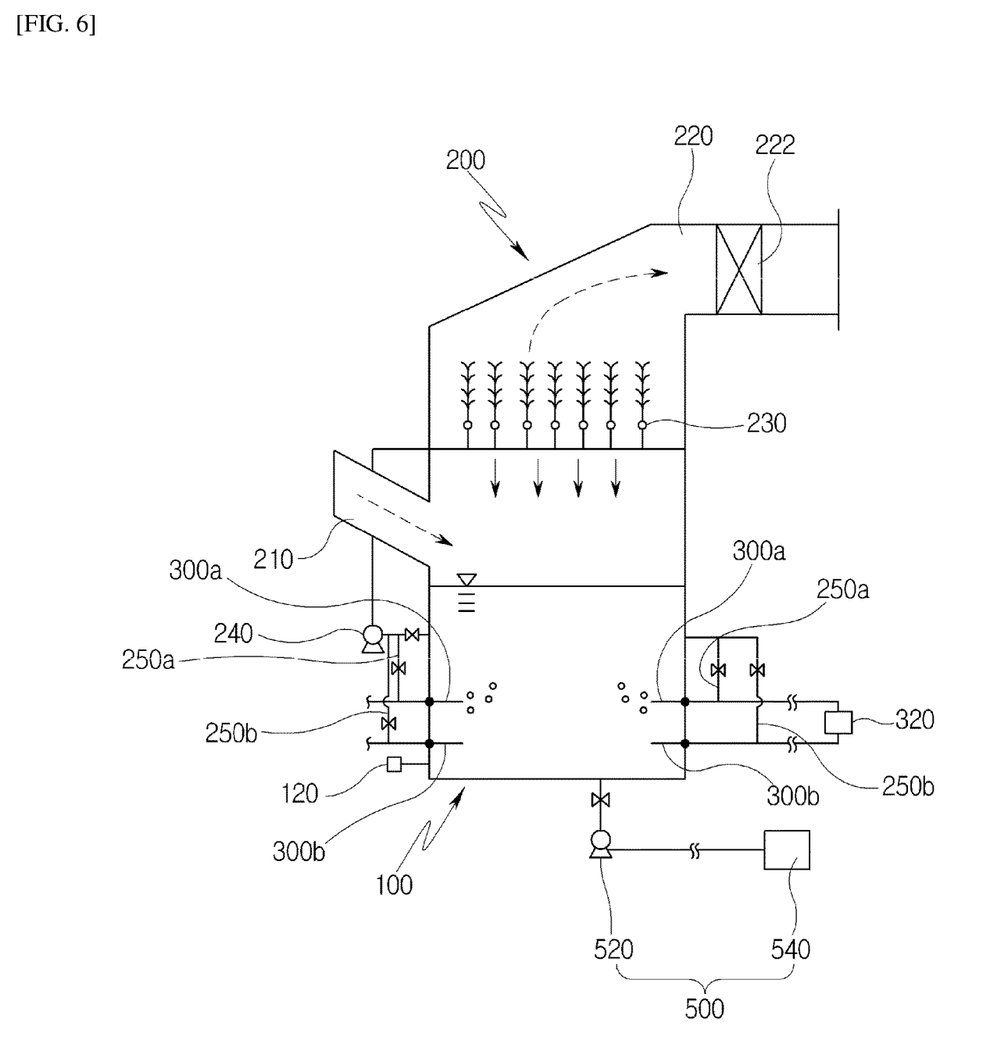
FIG. 6 is a schematic diagram illustrating a wet flue gas desulfurization apparatus according to a third embodiment of the present disclosure.

Next, a wet flue gas desulphurization apparatus according to a third embodiment of the present disclosure will be described with reference to FIG. 6.

The wet flue gas desulphurization apparatus according to the third embodiment differs from the first and second embodiments in that the oxygen supply pipes are not rotatably coupled with an absorption tank 100 via a swiveling coupling unit. That is, each oxygen supply pipe is fixedly coupled with the absorption tank 100.

In this embodiment, a set of multi-step oxygen supply pipes, including a first oxygen supply pipe for supplying air only to an upper region of the absorption tank 100 and a second oxygen supply pipe for supplying air only to a lower region of the absorption tank 100, is used.

In this embodiment, the oxygen supply pipes of each set are arranged at different heights. As illustrated in FIG. 6, a first oxygen supply pipe 300a and a second oxygen supply pipe 300b are aligned in parallel and disposed at different heights. The first oxygen supply pipe 300a is coupled to an upper portion of the absorption tank 100 and the second branch pipe 300b is coupled to a lower portion of the absorption tank 100.

In the present embodiment, to supply the absorption solution to the first oxygen supply pipe 300a and the second oxygen supply pipe 300b, a first pipeline 250a and a second pipeline 250b are respectively connected to the first oxygen supply pipe 300a and the second oxygen supply pipe 300b.

However, the present disclosure is not limited to the structure described above. In another embodiment, each of the oxygen supply pipes has a multi-furcated structure having multiple flow channels respectively directed toward an upper portion and a lower portion of the absorption tank.

In this case, the first oxygen supply pipe 300a and the second oxygen supply pipe 300b can be selectively used to supply air to the absorption tank. That is, by switching an air flow channel between the first oxygen supply pipe 300a and the second oxygen supply pipe 300b, an air supply target point within the absorption tank can be adjusted. Accordingly, the present embodiment can obtain the same effect as the first embodiment.

Figure 7:
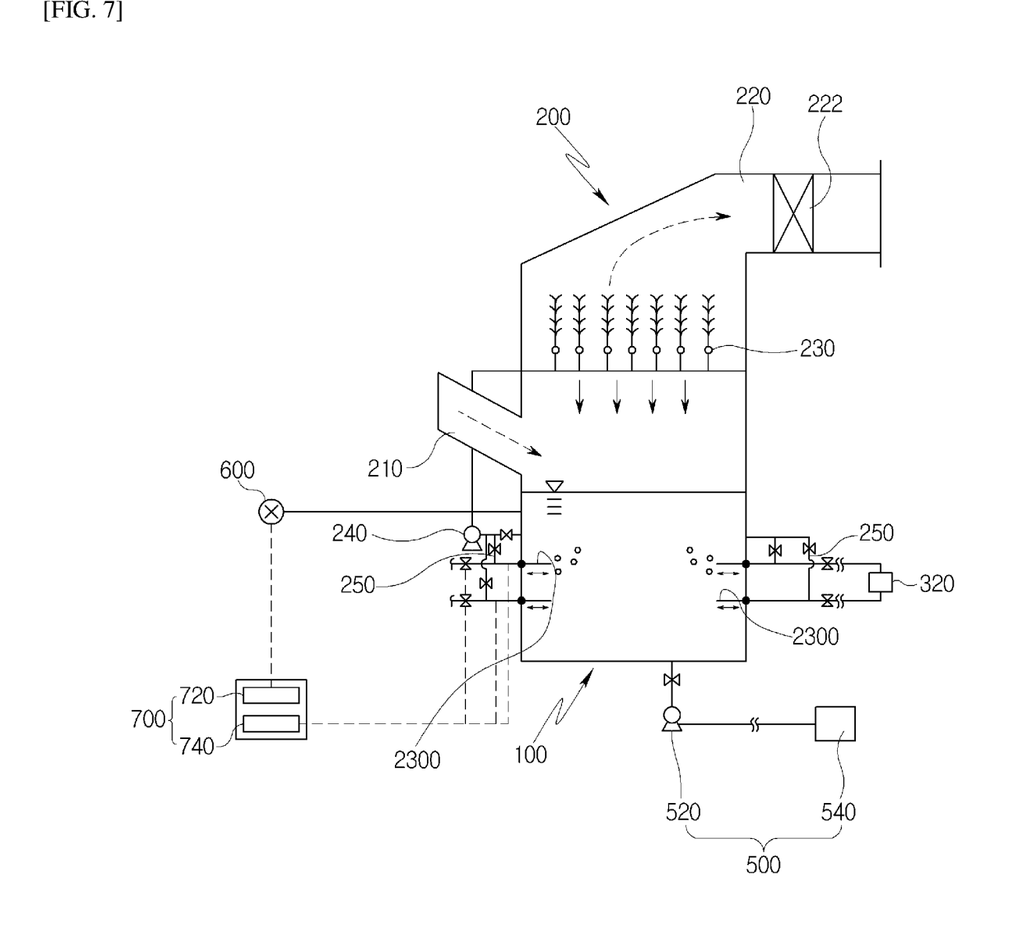
FIG. 7 is a schematic diagram illustrating a wet flue gas desulfurization apparatus according to a fourth embodiment of the present disclosure.

Next, a wet flue gas desulfurization apparatus according to a fourth embodiment of the present disclosure will be described with reference to FIGS. 7 through 9.

The wet flue gas desulfurization apparatus according to the fourth embodiment differs from the apparatuses of the first through third embodiments in that a target point (region) to which an oxygen-containing gas is supplied is horizontally adjusted instead of being vertically adjusted.

The wet flue gas desulfurization apparatus according to the fourth embodiment of the present disclosure mainly includes an absorption tank 100, an absorption tower 200, a flue gas inlet duct 210, a flue gas outlet duct 220, a spray unit 230, a circulation pump 240, an oxygen supply pipe 2300, a byproduct discharging unit 500, an ORP meter 600, and a controller 700. Here, since the absorption tank 100, the absorption tower 200, the flue gas inlet duct 210, the flue gas outlet duct 220, the spray unit 230, the circulation pump 240, and the byproduct discharging unit 500 are the same as those in the previously described embodiments, a description of these elements will not be repeated in this embodiment. Throughout the drawings, like elements are denoted by like reference numerals.

Specifically, in the present embodiment, the oxygen supply pipe 2300 is composed of a plurality of pipes that are arranged at different positions in a height direction of the absorption tank 100. However, the present disclosure is not limited to this configuration. Alternatively, a single-step oxygen supply pipe may be used.

Figure 8:
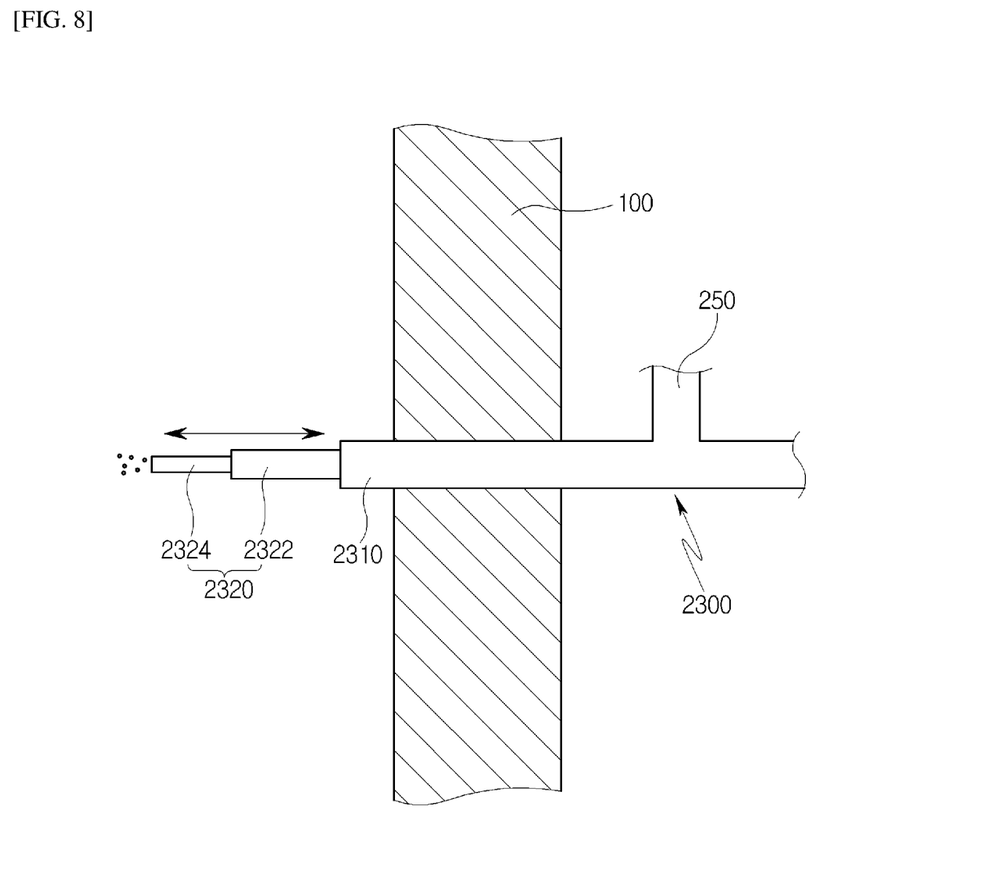
FIG. 8 is an enlarged view of a portion of FIG. 7.
Figure 9:
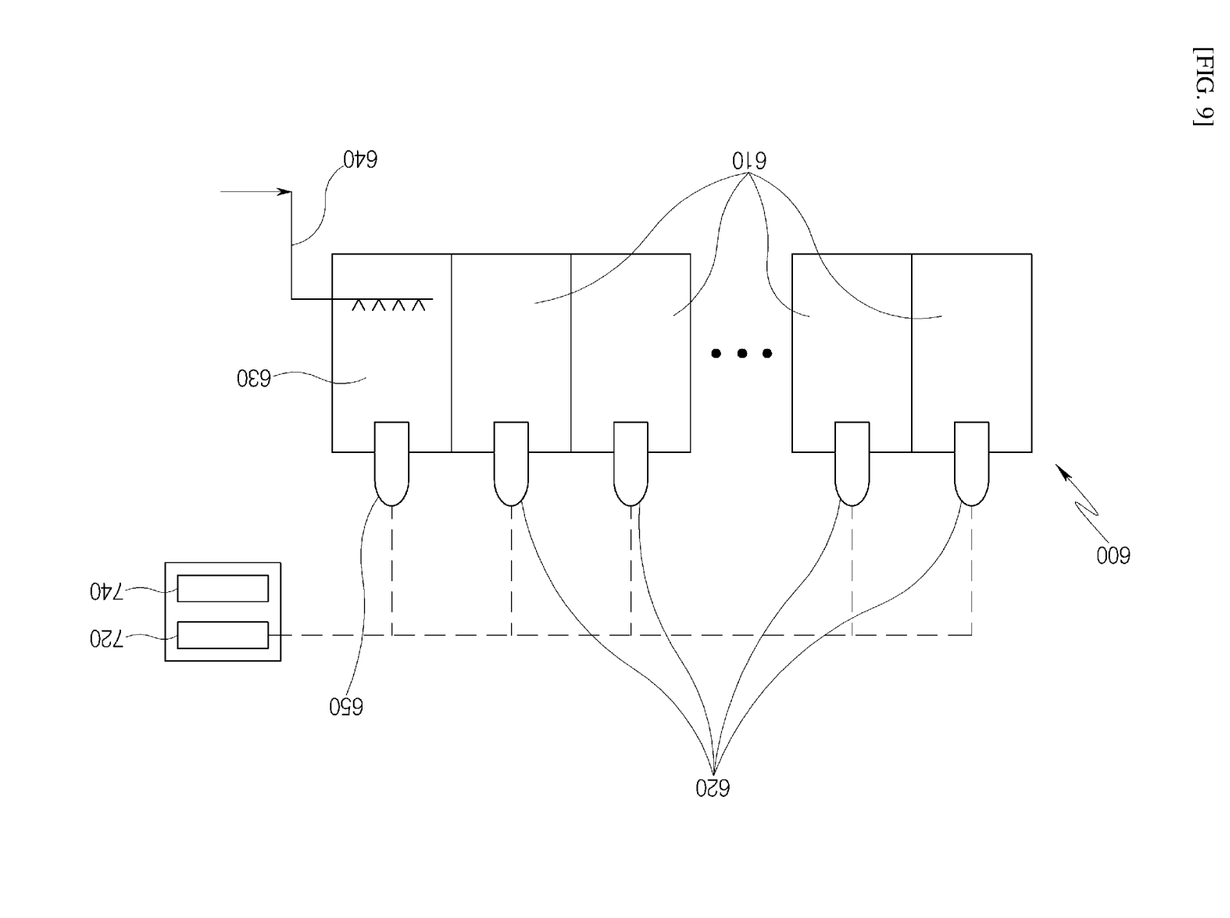
FIG. 9 is a schematic diagram illustrating an oxidation-reduction potential (ORP) meter of FIG. 7.

Referring to FIG. 8, the oxygen supply pipe 2300 will be described in greater detail. The oxygen supply pipe 2300 is configured to be adjustable in length within the absorption tank 100. That is, the oxygen supply pipe 2300 includes a first supply pipe 2310 fixedly coupled to the absorption tank 100 and at least one second supply pipe 2320 that can slide toward an internal space of the absorption tank 100 through the inside of the absorption tank 100. In the present embodiment, the second supply pipe 2320 includes a first sliding pipe 2322 that is slidable through the inside of the first supply pipe 2310 and a second sliding pipe 2324 that is slidable through the inside of the first sliding pipe 2322.

At this time, the inside of the first supply pipe 2310, the inside of the first slide pipe 2322, and the inside of the second slide pipe 2324 are all formed to communicate with each other, and an end of the second sliding pipe 2324 is provided with an injection hole through which air is jetted in the longitudinal direction of the pipes so as to be injected into the absorption tank.

Accordingly, with adjustment of the length of the oxygen supply pipe 2300 disposed at an upper portion of the absorption tank 100 or at a lower portion of the absorption tank 100, a target point (region) to which the oxygen-containing gas is supplied through the oxygen supply pipe 2300 can be adjusted according to an oxidation-reduction potential distribution in various regions in the absorption tank 100.

Since the absorption tank 100 is typically huge, even though the absorption solution in the absorption tank 100 is stirred, it is difficult to uniformly supply air through the entire body of the absorption solution in the absorption tank 100 by changing the orientation of the oxygen supply pipe 2300.

In this case, when the flow rate of the supplied air is insufficient, the concentration of calcium sulfite that is not oxidized increases. For this reason, problems such as inhibition of dissolution of calcium carbonate serving as an absorbent, deterioration of desulfurization performance, and an increase in chemical oxygen demand (COD) occur. In addition, when air is excessively supplied to accommodate load variation, etc., the maintenance cost increases and peroxides such as S2O6, S2O8, etc. are generated, leading to an increase in COD. Therefore, it is necessary to control the flow rate of air within an optimum range.

To this end, the wet flue gas desulfurization apparatus according to the present embodiment includes the ORP meter 600 and the controller 700 to adjust the target point to which the air is supplied through the oxygen supply pipe 2300, according to the oxidation-reduction potential distribution through the entire body of the absorption solution in the absorption tank 100.

The ORP meter 600 measures the oxidation-reduction potential (ORP) of the absorption solution in a plurality of regions in the absorption tank 100. As illustrated in FIG. 9, the ORP meter 600 includes a plurality of measurement vessels 610 for storing an absorption solution sampled from a plurality of regions in the absorption tank 100, respectively, a plurality of ORP electrodes 620 provided in the respective measurement vessels 610, a comparison vessel 630 for storing an absorption solution sampled from a predetermined region of the plurality of regions in the absorption tank 100, a sub-oxygen supply pipe 640 for supplying an oxygen-containing gas to the comparison vessel 630 to completely oxidize the absorbent contained in the absorption solution in the comparison vessel 630, and an ORP electrode 650 provided in the comparison vessel 630.

The inside of the absorption tank 100 can be vertically or horizontally divided into the plurality of regions.

The ORP values of the absorption solution in the respective regions of the absorption tank 100, i.e., the ORP values measured by the respective ORP electrodes 620 provided in the corresponding measurement vessels 610 are obtained. In addition, the ORP value of the completely oxidized absorption solution, measured by the ORP electrode 630 provided in the comparison vessel 630, is also obtained. The ORP values are continuously measured. The absorption solution in each of the measurement vessels 610 and the comparison vessel 630 may be returned to the absorption tank 100.

When the ORP value of the absorption solution in a certain region of the multiple regions of the absorption tank 100 is lower than a reference ORP value, the controller 700 performs control for adjusting the orientation or position of the oxygen supply pipe 2300 such that the oxygen-containing gas can be supplied to the region corresponding to the lower ORP value. Specifically, the controller 700 includes a comparator 720 for comparing the ORP values of the absorption solution in the respective measurement vessels 610, which are measured by using the respective ORP electrodes 620 provided in the respective measurement vessels 610, against the reference ORP value, and a driving unit 740 for adjusting the orientation of the oxygen supply pipe 2300 to change the position to which the oxygen-containing gas is supplied through the oxygen supply pipe 2300 according to the comparison result output from the comparator 720.

The comparator 720 receives the ORP values of the absorption solution in the respective regions, measured by the respective ORP electrodes 620 provided in the measurement vessels 610, and compares each of the received ORP values against the reference ORP value. The reference ORP value corresponds to the ORP value measured by the ORP electrode 650 installed in the comparison vessel 630.

The driving unit 740 receives the comparison result from the comparator 720 and adjusts the length of the oxygen supply pipe 2300 so that a larger amount of oxygen-containing gas (i.e., air) can be supplied to the region in which the absorption solution exhibits a lower ORP value than the reference ORP value.

That is, the air is supplied to every region in which the absorption solution exhibits an ORP value lower than the reference ORP value so that the ORP value required for the complete oxidation of the absorbent contained in the absorption solution can be reached in all the regions of the absorption tank 100. The driving unit 740 includes an actuator or the like.

Further, when the ORP values of all regions are lower or higher than the reference ORP value, the driving unit 740 may control the flow rate of the air supplied through the oxygen supply pipe 2300. That is, a flow rate control valve installed on the oxygen supply pipe 2300 connected with the gas tank 320 in which the air is stored may be controlled to adjust the flow rate of the air supplied through the valve.

Here, a method of adjusting the position to which the oxygen-containing gas is supplied, within the absorption tank 100, will be described. First, the ORP values of the respective regions of the absorption tank 100, measured by the ORP meter 600, are compared against the reference ORP value (comparison step). Next, the position in the absorption tank, to which the oxygen-containing gas is supplied through the oxygen supply pipe 2300, is adjusted in accordance with the comparison result output from the comparator (position adjustment step).

In the present embodiment, the position adjustment is performed by adjusting the length of the oxygen supply pipe 2300. With the adjustment of the length of the oxygen supply pipe 2300, the oxygen supply target point can be horizontally arranged within the absorption tank 100.

However, the method of horizontally adjusting the oxygen supply target point is not limited thereto. Alternatively, the density of the absorption solution in each of the multiple regions of the absorption tank may be measured by the density meter 120, and the horizontal adjustment of the oxygen supply target point may be performed according to the density of each of the regions of the absorption tank.

Figure 10:
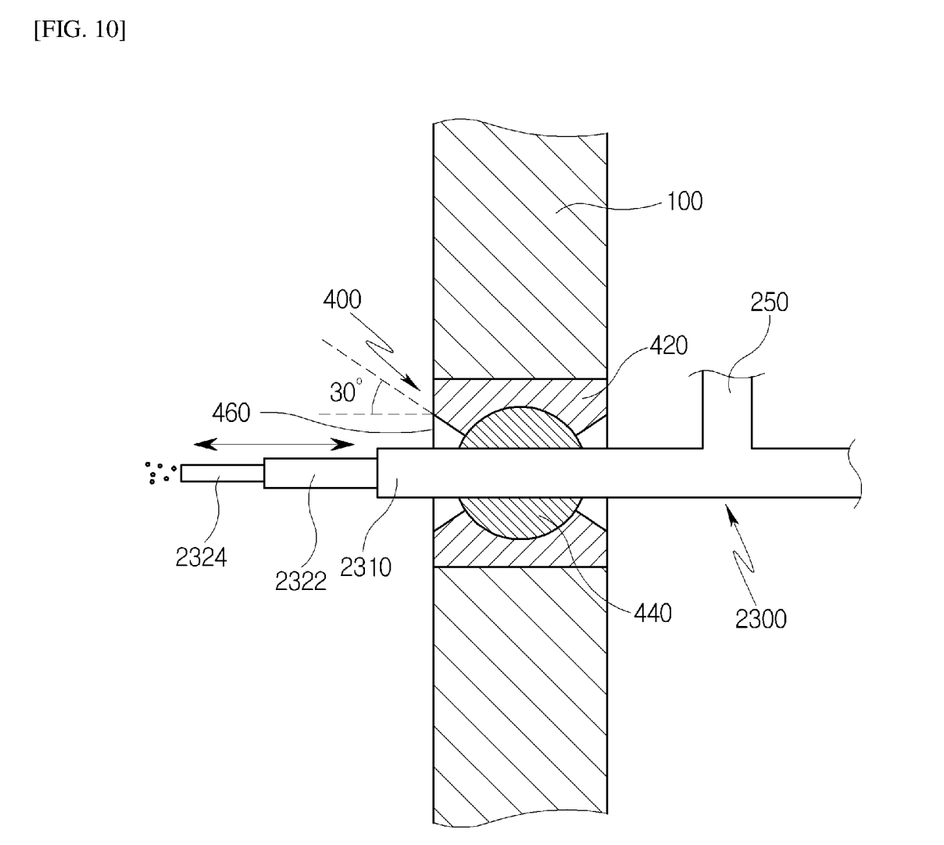
FIG. 10 is an enlarged view of a portion of FIG. 7 according to a fifth embodiment of the present disclosure.

The embodiment described above suggests an example in which the position or orientation of the inner end portion of the oxygen supply pipe through which the oxygen-containing is supplied to the absorption tank 100 is adjusted horizontally or vertically. However, the present disclosure is not limited to this configuration. For example, the inner end portion of the oxygen supply pipe can be vertically and horizontally within the absorption tank 100. FIG. 10 is a diagram illustrating such an example.

Referring to FIG. 10, a wet flue gas desulfurization apparatus according to a fifth embodiment illustrated is the same as that of the first embodiment except that the oxygen supply pipe 300 provided in the first embodiment is replaced with the oxygen supply pipe 2300 provided in the fourth embodiment.

Therefore, the position of the inner end portion of the oxygen supply pipe can be adjusted according to the oxidation-reduction potential distribution in the absorption tank 100. That is, the ORP values of the absorption solution in various regions of the absorption tank 100 are compared against the reference ORP value, and the oxygen-containing gas is supplied to the regions having a lower ORP value than the reference ORP value. Therefore, the oxygen-containing gas for causing an oxidation reaction can be effectively supplied for each region in the absorption tank.

The present invention is not limited to the above-described specific embodiments and description, and various changes and modifications thereof may be made without departing from the scope of the present invention as defined in the appended claims by those skilled in the art. In addition, such variations may fall within the protection scope of the present invention.

What is claimed is:

1. A wet flue gas desulfurization apparatus comprising:
an absorption tank in which an absorption solution containing an alkaline absorbent is stored;
an absorption tower extending upward from the absorption tank;
a flue gas inlet duct communicating with a first portion of the absorption tower;
a flue gas outlet duct communicating with a second portion of the absorption tower;
a spray unit configured to spray the absorption solution inside the absorption tower;
a circulation pump configured to pump the absorption solution out of the absorption tank and to supply the absorption solution to the spray unit;
a byproduct discharging unit configured to discharge a byproduct downward from the absorption tank; and
an oxygen supply pipe through which an oxygen-containing gas is supplied to a target point in the absorption tank, the target point being adjustable along a vertical direction or a horizontal direction,
wherein the oxygen supply pipe comprises a plurality of oxygen supply pipes arranged at multiple steps along a height direction of the absorption tank.

2. The wet flue gas desulfurization apparatus according to claim 1, wherein the plurality of oxygen supply pipes are selectively used for supplying the oxygen-containing gas to a region within the absorption tank.

3. The wet flue gas desulfurization apparatus according to claim 1, further comprising a driving unit configured to move the oxygen supply pipe to adjust the target point.

4. The wet flue gas desulfurization apparatus according to claim 1, wherein the oxygen supply pipe comprises a plurality of oxygen supply pipes respectively arranged at intervals along a circumferential direction of the absorption tank, each oxygen supply pipe being inclined at an equal angle.

5. The wet flue gas desulfurization apparatus according to claim 1, wherein the oxygen supply pipe is coupled with the absorption tank such that a length of the oxygen supply pipe is adjustable within the absorption tank.

6. The wet flue gas desulfurization apparatus according to claim 5, wherein the oxygen supply pipe comprises:
a first supply pipe coupled with the absorption tank, and
at least one second supply pipe that is slidable through an inside of the first supply pipe to move toward the inside of the absorption tank.

7. The wet flue gas desulfurization apparatus according to claim 1, further comprising a density meter configured to measure a density of the absorption solution in the absorption tank.

8. The wet flue gas desulfurization apparatus according to claim 7, wherein the oxygen-containing gas is supplied to a lower region in the absorption tank when the density measured by the density meter is not greater than a predetermined value, and the oxygen-containing gas is supplied to an upper region in the absorption tank when the density measured by the density meter is greater than the predetermined value.

9. The wet flue gas desulfurization apparatus according to claim 1, further comprising a swiveling coupling unit for coupling the oxygen supply pipe to the absorption tank via a through hole formed in a wall of the absorption tank, the swiveling coupling unit comprising:
an outer shell fixed in the through hole; and
an inner body rotatably disposed in the outer shell and fixedly combined with the oxygen supply pipe.

10. The wet flue gas desulfurization apparatus according to claim 9, wherein the outer shell has a middle hole to accommodate the inner body and is open at both axial ends such that the oxygen supply pipe extends through the outer shell from one axial end to the other axial end of the outer shell.

11. The wet flue gas desulfurization apparatus according to claim 10, wherein the oxygen supply pipe axially extends through the outer shell and has an inner end that is disposed in the absorption tank and that includes bend.

12. The wet flue gas desulfurization apparatus according to claim 10, wherein the outer shell has an inner hole and an outer hole provided respectively at an inner side and an outer side of the middle hole, and each of the inner and outer holes is tapered toward the axial end of the outer shell such that a vertical dimension of each of the inner and outer holes gradually increases with a distance from the middle hole to the axial end of the outer shell.

13. The wet flue gas desulfurization apparatus according to claim 12, wherein a size of the inner hole and a size of the outer hole are determined according to an upward inclination angle and a downward inclination angle of the oxygen supply pipe.

14. The wet flue gas desulfurization apparatus according to claim 12, further comprising
a sealing member disposed in the inner hole and configured to prevent an inside of the inner hole from communicating with an inside of the absorption tank,
wherein the oxygen supply pipe passes through the sealing member, and the sealing member is deformable according to an upward inclination and a downward inclination of the oxygen supply pipe.

15. The wet flue gas desulfurization apparatus according to claim 1, further comprising an oxidation-reduction potential (ORP) meter configured to measure an ORP value of the absorption solution in each of a plurality of regions in the absorption tank.

16. The wet flue gas desulfurization apparatus according to claim 15, wherein the ORP meter includes:
a plurality of measurement vessels for storing the absorption solution sampled from the plurality of regions of the absorption tank, respectively; and
a plurality of ORP electrodes installed in the measurement vessels, respectively.

17. The wet flue gas desulfurization apparatus according to claim 16, wherein the ORP meter further comprises:
a comparison vessel for storing the absorption solution sampled from a predetermined region of the plurality of regions of the absorption tank;
a sub-oxygen supply pipe configured to supply the oxygen-containing gas to the comparison vessel to completely oxidize the absorption solution in the comparison vessel; and
an ORP electrode installed in the comparison vessel.

18. The wet flue gas desulfurization apparatus according to claim 17, wherein when an ORP value of the absorption solution sampled from one region of the plurality of regions of the absorption tank is lower than a reference ORP value, the oxygen-containing gas is supplied to the one region.

19. The wet flue gas desulfurization apparatus according to claim 18, wherein the reference ORP value corresponds to an ORP value measured by the ORP electrode installed in the comparison vessel.

* * * * *